United States Patent
Wu

(10) Patent No.: US 12,544,548 B2
(45) Date of Patent: Feb. 10, 2026

(54) MOTOR AND A TATTOO PEN USING THE SAME

(71) Applicant: Zhejiang Hedao Holding Co., Ltd., Zhejiang (CN)

(72) Inventor: Jian Wu, Zhejiang (CN)

(73) Assignee: Zhejiang Hedao Holding Co., Ltd., Hangzhou (CN)

( * ) Notice: Subject to any disclaimer, the term of this patent is extended or adjusted under 35 U.S.C. 154(b) by 612 days.

(21) Appl. No.: 17/936,831

(22) Filed: Sep. 29, 2022

(65) Prior Publication Data

US 2023/0100667 A1   Mar. 30, 2023

(30) Foreign Application Priority Data

Sep. 30, 2021 (CN) .......................... 202111156911.X
Sep. 30, 2021 (CN) .......................... 202111156942.5

(51) Int. Cl.
- *A61M 37/00* (2006.01)
- *H02K 3/04* (2006.01)
- *H02K 7/14* (2006.01)

(52) U.S. Cl.
CPC ........... *A61M 37/0076* (2013.01); *H02K 3/04* (2013.01); *H02K 7/14* (2013.01); *A61M 2205/587* (2013.01)

(58) Field of Classification Search
CPC ..... A61M 37/0076; H02K 1/16; H02K 41/02; H01F 7/1646; H02P 25/032; H02P 25/06; H02P 8/10; H02P 8/02
USPC .......................................................... 81/9.22
See application file for complete search history.

(56) References Cited

U.S. PATENT DOCUMENTS

| | | | | | |
|---|---|---|---|---|---|
| 485,767 | A | * | 11/1892 | Lewis ............... | A61M 37/0076 346/143 |
| 498,519 | A | * | 5/1893 | Lewis et al. ...... | A61M 37/0076 346/143 |
| 516,212 | A | * | 3/1894 | Lewis ............... | A61M 37/0076 346/143 |
| 6,345,553 | B1 | * | 2/2002 | Adler ..................... | A45D 34/04 606/186 |
| 6,505,530 | B2 | * | 1/2003 | Adler ..................... | A45D 34/04 606/186 |

(Continued)

FOREIGN PATENT DOCUMENTS

| CN | 206852920 | 1/2018 |
|---|---|---|
| CN | 206852920 U | 1/2018 |

(Continued)

*Primary Examiner* — David B. Thomas
(74) *Attorney, Agent, or Firm* — Javalon Law, PC

(57) ABSTRACT

Disclosed in the present invention is a motor comprising a coil assembly configured to produce a magnetic field in the axis direction of the motor when there is current in the coil, a line motion shaft set passing through the coil assembly in said axis direction, at least one end of said line motion shaft being set extending out of the coil assembly; and a permanent magnet set on the end of said line motion shaft extending out of the coil assembly; wherein when the coil assembly is supplied with current the direction of which alternates, the direction of the magnetic field produced in the axis direction of the motor alternates correspondingly, thereby producing attractive force and repulsive force on the permanent magnet alternatively.

4 Claims, 3 Drawing Sheets

(56) References Cited

U.S. PATENT DOCUMENTS

| | | | | |
|---|---|---|---|---|
| 6,596,007 B2* | 7/2003 | Evans | A61M 37/0076 | 606/186 |
| 6,774,754 B2* | 8/2004 | Evans | H01F 7/14 | 606/186 |
| 6,950,004 B2* | 9/2005 | Godoy | H02K 33/04 | 81/9.22 |
| 10,441,764 B2* | 10/2019 | Akridge | A61M 35/003 | |
| 10,855,207 B2* | 12/2020 | Blank | A61N 1/36017 | |
| 11,400,268 B2* | 8/2022 | Siciliano | A61M 37/0015 | |
| 11,642,507 B2* | 5/2023 | Grimmelbein | A61M 37/0076 | 606/186 |
| 12,090,296 B2* | 9/2024 | Blank | H02K 1/16 | |
| 2002/0050884 A1* | 5/2002 | Godoy | H02K 33/04 | 335/128 |
| 2002/0069726 A1* | 6/2002 | Adler | A61M 37/0076 | 81/9.22 |
| 2003/0050657 A1* | 3/2003 | Evans | A61M 37/0076 | 606/186 |
| 2003/0102945 A1* | 6/2003 | Evans | H01F 7/14 | 335/220 |
| 2005/0028647 A1* | 2/2005 | Sloan | A61M 37/0076 | 81/9.22 |
| 2005/0206485 A1* | 9/2005 | Godoy | H02K 33/04 | 335/132 |
| 2007/0083223 A1* | 4/2007 | Kluge | A61M 37/0084 | 606/185 |
| 2007/0208363 A1* | 9/2007 | Lai | A61M 37/0076 | 606/186 |
| 2008/0300615 A1* | 12/2008 | Colton | A61M 37/0076 | 606/186 |
| 2011/0125179 A1* | 5/2011 | Dell'Aquila | A61M 37/0076 | 606/186 |
| 2011/0288575 A1* | 11/2011 | Colton | A61M 37/0076 | 606/185 |
| 2013/0096599 A1* | 4/2013 | Colton | A61M 37/0076 | 606/186 |
| 2014/0117786 A1* | 5/2014 | Gosvener | H02K 33/16 | 310/23 |
| 2016/0121093 A1* | 5/2016 | Fan | H04W 4/80 | 606/185 |
| 2017/0207690 A1* | 7/2017 | Paweletz | H02K 33/16 | |
| 2022/0040467 A1* | 2/2022 | Blank | H02K 41/02 | |

FOREIGN PATENT DOCUMENTS

| | | | |
|---|---|---|---|
| CN | 208077717 | | 11/2018 |
| CN | 208077717 U | | 11/2018 |
| CN | 208436246 | | 1/2019 |
| CN | 208436246 U | | 1/2019 |
| CN | 110601495 | | 12/2019 |
| CN | 110601495 A | | 12/2019 |
| CN | 110729845 A | * | 1/2020 |
| CN | 211151786 U | * | 7/2020 |
| CN | 111659001 A | * | 9/2020 |
| DE | 19509195 A | * | 9/1996 |
| TW | M274841 U | * | 9/2005 |

* cited by examiner

MOTOR AND A TATTOO PEN USING THE SAME

CROSS REFERENCE

The present application claims priority of the Chinese patent applications No. 202111156942.5 and No. 202111156911.X filed on Sep. 30, 2021, the specifications of which are incorporated here by reference.

TECHNICAL FIELD

The present invention belongs to the field of consumer electronics. More specifically, the present invention is associated with a motor and a tattoo pen using the motor.

BACKGROUND

Traditional motors are rotational comprising a stator and a rotor, wherein the rotor rotates driven by a magnetic field, thereby driving the shaft to rotate to output motion energy from the shaft.

Electronics like electric tattoo pens conventionally use such rotational motors as power to drive the needle to reciprocate to perform the tattooing operation. To transform the rotational motion of the motor shaft into reciprocating line motion of the needle, complicated gear transmission mechanisms are required. For example, the Chinese patent application No. 202111156942.5 discloses such a mechanism.

FIG. 1 shows the breakdown structure of a tattoo pen equipped with a rotational motor. As shown in the figure, the tattoo pen comprises a housing a1, a housing a2, and battery case a7, battery a2, controlling circuit board a8, power case a6, and needle set a4 that held in housing a1 and housing a2 respectively, as well as an illuminating unit a5.

FIG. 2 shows the specific structure in the power case a6, in which the motor outputs motion energy via its rotational shaft, the rotational motion of the motor is transformed into reciprocating motion of the crank shaft via the perpendicular gear assembly and the eccentric crank shaft, the eccentric crank shaft in turn drives the needle assembly a4 to reciprocate to perform the tattooing operation.

Such a gear transmission mechanism has the drawback of complicated structure, high cost, and easy breakdown. Furthermore, the transmission mechanism consumes big amount of energy in transmission, thereby reduces the overall energy efficiency of the product.

Therefore, there is need for a technology to avoid the above complicated transmission mechanism to thereby simplify the product structure, reduce the cost, reduce the breakdown rate, while increasing the energy efficiency of the product.

SUMMARY OF THE INVENTION

To solve the above mentioned problem, in one aspect of the present invention, there is provided a motor comprising:
  a coil assembly configured to produce a magnetic field in the axis direction of the motor when there is current in the coil;
  a line motion shaft set passing through the coil assembly in said axis direction, at least one end of said line motion shaft being set extending out of the coil assembly; and
  a permanent magnet set on the end of said line motion shaft extending out of the coil assembly: wherein when the coil assembly is supplied with current the direction of which alternates, the direction of the magnetic field produced in the axis direction of the motor alternates correspondingly, thereby producing attractive force and repulsive force on the permanent magnet alternatively.

In one embodiment of the present invention, said coil assembly of the motor comprises a coil fixture and a coil. The coil fixture comprises a coil axis of cylinder shape and two flanges set on both ends of the coil axis. The coil is wound around the coil axis and constrained between the two flanges. Wherein the coil axis is hollow with a through-hole in its axis direction to accommodate the line motion shaft to pass through.

In one embodiment of the present invention, said coil fixture of the above mentioned motor is made of aluminium alloy material, while said line motion shaft is made of stainless steel material.

In another aspect of the present invention, there is provided a tattoo pen comprising:
  a needle assembly for pricking operation on skin;
  a motor for driving the needle assembly to move: wherein the motor is the motor as set forth above.

In one embodiment of the present invention, the needle assembly of the tattoo pen further comprises a needle set and a coupling set, said coupling set is configured to couple the needle set to the shaft of the motor.

In another embodiment of the present invention, the coupling set of the tattoo pen is configured to control the range of motion of the needle set.

In another embodiment of the present invention, the tattoo pen further comprises an illuminating unit set on the needle set so that when the needle is in operation for tattooing the illuminating unit illuminates the skin portion being tattooed.

In another embodiment of the present invention, the tattoo pen further comprises a housing in which the needle assembly and the motor are contained.

With the motor and the tattoo pen of the present invention, the complicated transmission mechanism in traditional electronics like tattoo pens can be avoided, which simplifies the structure of the products, simplifies the manufacturing process, reduces malfunction rate, so to extend the life cycle of the products and to improve the energy efficiency of the products.

BRIEF DESCRIPTION OF THE DRAWINGS

Below the principles and embodiments of the present invention will be described in more details by reference of the drawings in which.

DETAILED DESCRIPTION

The principles of the present invention will now be described by reference to embodiments. Particulars described here is merely for the purpose of illustrating principles of the present invention. Under no circumstances should the protection scope of the present invention be deemed as limited to embodiments or particulars described here. The scope of the present invention is merely determined by the claims.

Figure 1:
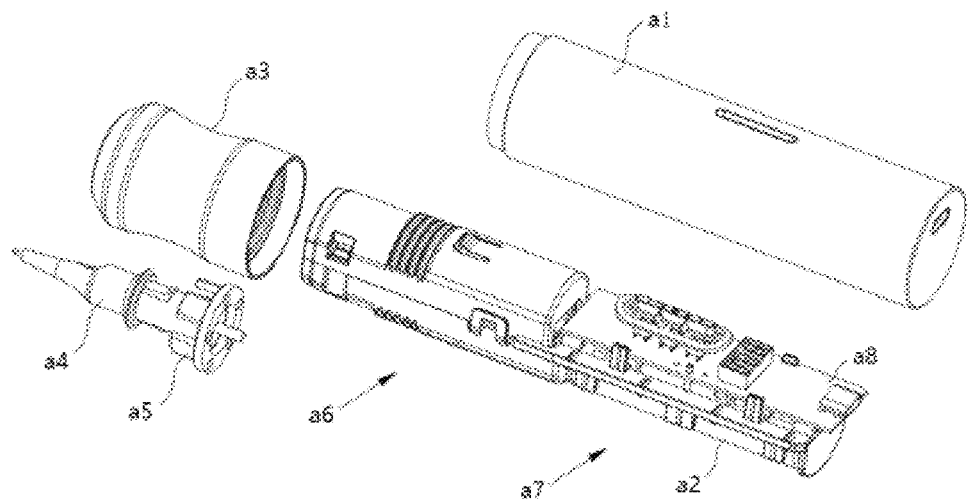
FIG. 1 shows the breakdown structure of a traditional tattoo pen with a rotational motor as power source.
Figure 2:
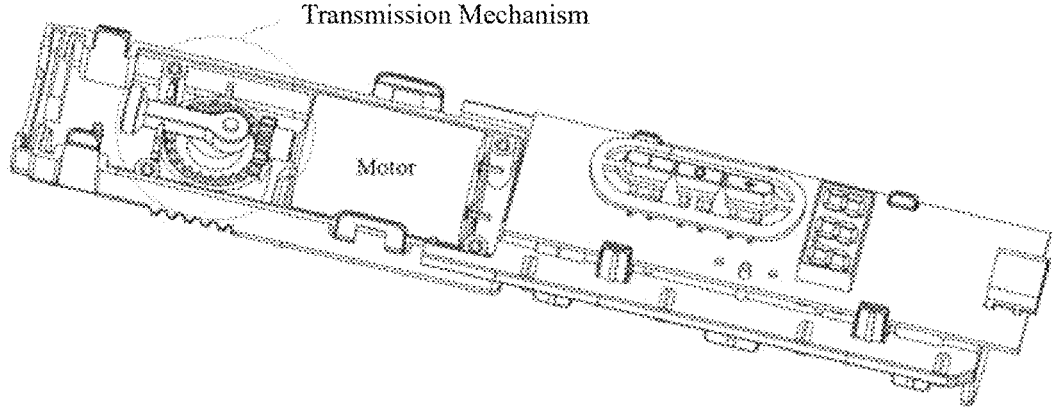
FIG. 2 shows the transmission mechanism of a traditional tattoo pen.
Figure 3:
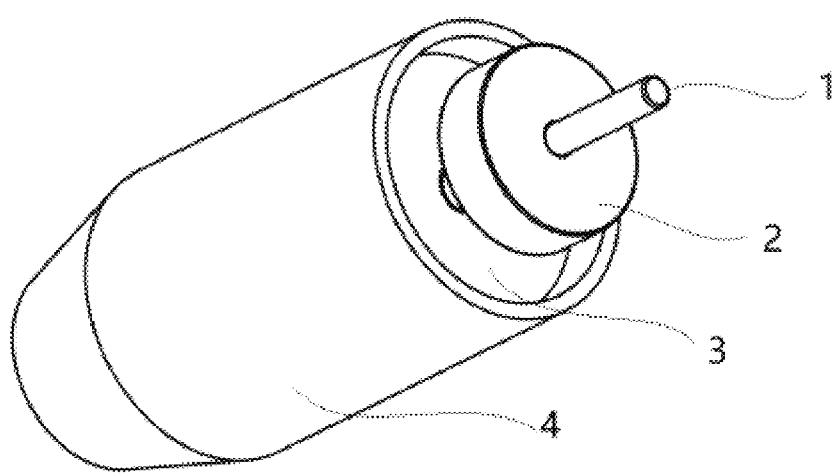
FIG. 3 shows the perspective view of a motor according to one aspect of the present invention.

FIG. 3 shows the perspective view of a motor according to one aspect of the present invention. As indicated in FIG. 3, the motor according to the present invention comprises a line motion shaft 1 and a permanent magnet 2 fixed on the line motion shaft 1, as well as the housing 4 and the coil fixture 3. The coil fixture 3 is configured for the exciting coil to be wound thereon so to provide the magnetic field required for the motor to operate.

Figure 4:
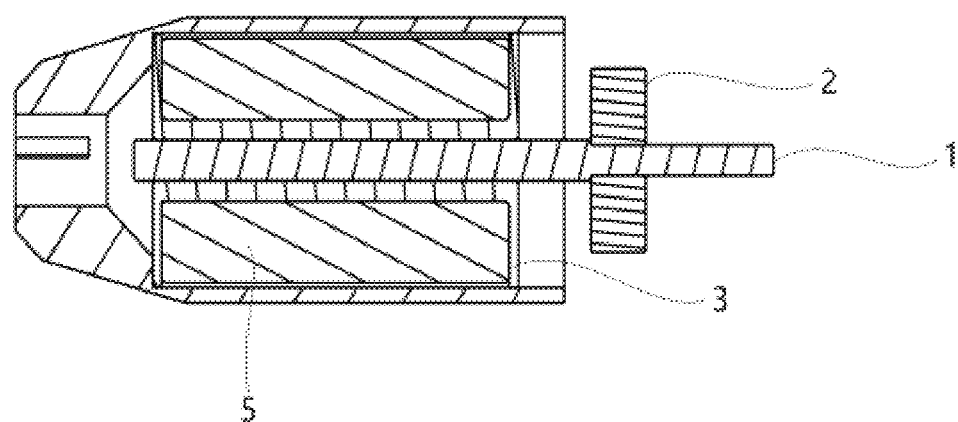
FIG. 4 shows a sectional view of the motor of FIG. 3.

FIG. 4 shows a sectional view of the motor of FIG. 3 cut in the longitudinal direction of the motor crossing the central axis. There shown is the structural relationship of the housing 5, the coil 5, the coil fixture 3, the line motion shaft 1 and the permanent magnet 2.

The coil assembly formed by the coil 5 and the coil fixture 3 is set in the motor housing 4. The line motion shaft 1 is set passing through the coil assembly in its axis direction. One end of the line motion shaft 1 is set extending out of the coil assembly. On the end of the line motion shaft 1 that extends out of the coil assembly, the permanent magnet 2 is set in a fixed way so that when the permanent magnet 2 is driven to move by the magnetic field, the line motion shaft 1 moves accordingly.

Figure 5:
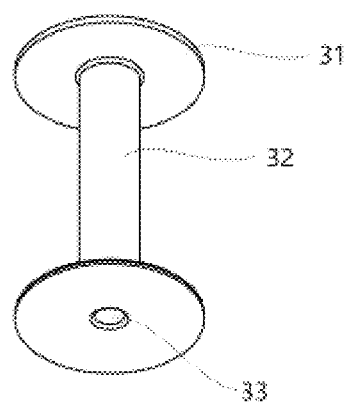
FIG. 5 shows the structure of the coil fixture of the motor shown in FIG. 3.

FIG. 5 shows the structure of the coil fixture 4 of the motor shown above. As can be seen from the figure, the coil fixture 4 comprises a coil axis 32 of cylinder shape and two flanges 31 fixed on both ends of the coil axis. The coil axis is hollow with a through-hole 33 in its axis direction to accommodate the line motion shaft 1 to pass through.

The way of the coil 5 winding on the coil fixture 4 can be winding along a same direction, e.g., clockwise or counterclockwise, so that when the coil is fed with current, there will be a magnetic field excited in the central axis of the coil 5, i.e., in the through-hole 33 of the coil fixture 4 the direction of which is determined on the right-hand rule. The polarity or direction of the magnetic field depends on the direction of the current in the coil and will change when the direction of the current in the coil changes. For example, if the direction of the magnetic field in the through-hole 33, according to the right-hand rule, is towards the permanent magnet 2 when positive current is fed to the coil, the magnetic field excited when negative current is fed to the coil will be away from the permanent magnet 2. Magnetic field with different direction exerts attractive force or repulsive force on the permanent magnet. Therefore, by feeding current with alternative direction or polarity, a magnetic field with alternative direction or polarity will be produced, thereby driving the permanent magnet 2 to move in a reciprocal way.

In operation of the motor of the present invention, the through-hole 33 of the coil fixture 4 serves as a part of the magnetic path. The value of the reluctance will have significant influence on the efficiency of the motor. The line motion shaft 1 is set passing through the through-hole 33, thereby forms a part of the magnetic path, and is the major part.

To reduce the reluctance of the through-hole 33 portion, on one hand, the space between the line motion shaft 1 and the through-hole 33 is to be as smaller as possible. This purpose could be achieved by fine machining. In one embodiment of the present invention, the diameter of the line motion shaft 1 is 3 mm, while the diameter of the through-hole 33 is 3.76 mm. With this configuration, very good effect has been achieved.

On the other hand, the line motion shaft 1 shall be made with ferrimagnetic materials with fine magneto-conductivity. Furthermore, in consideration of the special working environment of a tattoo pen, factors of rustiness caused by the humid environment which may reduce the product's life cycle should also be taken into account. In one embodiment, the material of the line motion shaft 1 is stainless steel.

Using stainless steel as material of the line motion shaft 1 not only prevents untoward effects like rustiness, but also increases the smoothness of the line motion shaft 1 and reduces friction, thereby improving the overall operation efficiency of the motor.

The coil fixture 4 also forms a part of the magnetic path. In selection of the material of the coil fixture 4, factors that can reduce the reluctance of the path and the vortexing loss shall also be considered. Therefore, ferrimagnetic materials with fine magneto-conductivity should be considered and measures should be taken to block vortexing. At the same time, in the case of a tattoo pen, the very limited space to install the motor should also be considered. In that case, limit to the size of the motor is very strict. In one embodiment of the present invention, aluminium alloy with fine ductility is chosen as the material of the coil fixture 4. With the find ductility, in the case of small size, small thickness of the coil axis 32 and flanges 31, it is easy to mold by stretching. Furthermore, with good stiffness, such a coil fixture is sufficient to provide support to the coil. Furthermore, with relatively big resistance, vortexing is effectively depressed. Therefore, fine effects are achieved with aluminium alloy as the material of the coil fixture 4.

Figure 6:
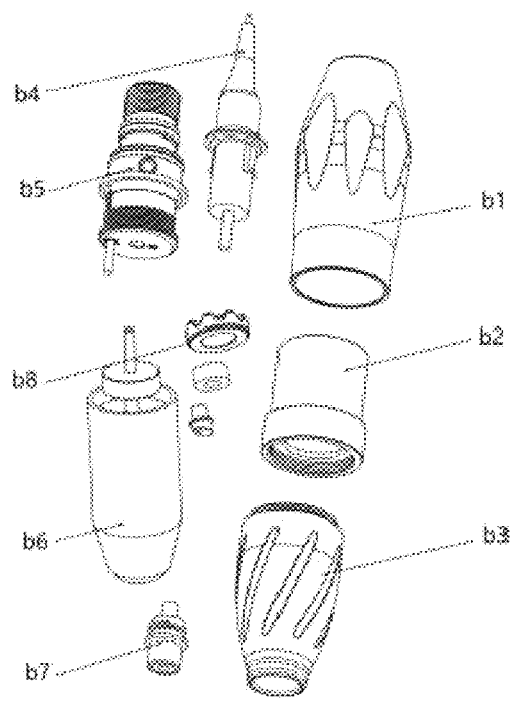
FIG. 6 shows the breakdown structure of a tattoo pen according to another aspect of the present invention.

FIG. 6 shows the breakdown structure of a tattoo pen according to another aspect of the present invention. As can be seen, the tattoo pen of the present invention comprises a housing and the functional parts contained in the housing. In one embodiment, the housing if formed in three parts matching each other, i.e., the front part b1, the middle part b2, and the rear part b3. In an assembled tattoo pen, the front part b1 corresponds to the pen tip portion, the rear part b3 corresponds to the pen end portion, while the middle part b2 is located between the front part b1 and the rear part b3.

In one embodiment of the present invention, the functional parts include the driving motor b6, the needle set b4, the coupling set b5 and the joint part b8. The needle set b4 is configured to prick a user's skin. The driving motor b6 is configured to provide motion power to the needle set b4. The coupling set b5 is configured to couple the needle set to the line motion shaft of the motor b6 so that when the line motion shaft moves in a reciprocal way, the needle set b4 follows to move in the same way. The joint part b8 performs connection of the coupling set b5 and the motor b6.

The coupling set b5 transmits power of the motor b6 to the needle set b4. The coupling set b5 can be set with multiple operation positions to control the range of motion of the needle set, thereby control the depth of the needle pricking into the skin, thereby achieving tattooing operation with various depth.

On the coupling set b5, other parts could be set. For example, a switch that can couple and decouple the needle set b4 to and from the motor can be set.

In another embodiment, an illuminating unit can be set on the needle set b4, e.g., unit a5 shown in FIG. 5. In such a case, a switch for controlling the illuminating unit can be set on the coupling set b5 to turn on and off the illumination.

b7 indicates a power port for connecting the tattoo pen to a power source. In one embodiment of the present invention, the tattoo pen is powered with AC of 12 v and 50 Hz. Of course, in other embodiments, the tattoo pen can also adopt DC, e.g., of 5v or 12v. In such a case, the tattoo pen can also comprise a unit that transforms direct current into a current with alternating directions or polarity so that coil 5 of the motor is supplied with a current with alternating directions or polarity so to produce a magnetic field with alternating polarity to drive the line motion shaft to reciprocate.

Further, in other embodiments, the tattoo pen can also be powered with batteries. In such a case, the tattoo pen will also comprises a battery case, as well as a unit that transforms direct current into a current with alternating directions or polarity so that coil 5 of the motor is supplied with a current with alternating directions or polarity so to produce a magnetic field with alternating polarity to drive the line motion shaft to reciprocate.

Different aspects, particulars, and embodiments of the present invention have been described. It should be appreciated by those skilled in the art that such aspects, particulars, and embodiments can be combined in various ways without deviating from the principles of the present invention.

What is claimed is:

1. A tattoo pen comprising a needle assembly for pricking operation on skin, a motor for driving the needle assembly to move, characterized in that the motor comprises:
    a coil assembly configured to produce a magnetic field in the axis direction of the motor when there is current in the coil;
    a line motion shaft set passing through the coil assembly in said axis direction, at least one end of said line motion shaft being set extending out of the coil assembly; and
    a permanent magnet set on the end of said line motion shaft extending out of the coil assembly; wherein
    when the coil assembly is supplied with current the direction of which alternates, the direction of the magnetic field produced in the axis direction of the motor alternates correspondingly, thereby producing attractive force and repulsive force on the permanent magnet alternatively;
    the coil assembly comprises a coil fixture and a coil, the coil fixture comprises a coil axis of cylindrical shape and two flanges disposed at both ends of the coil axis, the coil is wound around the coil axis and constrained between the two flanges, the coil axis is hollow and includes a through-hole along its axis direction to receive a line motion shaft,
    the coil assembly is made of aluminium alloy, and the line motion shaft is made of stainless steel,
    the needle assembly further comprises a needle set and a coupling set, said coupling set is configured to couple the needle set to the shaft of the motor.

2. The tattoo pen according to claim 1 characterized in that the coupling set of the tattoo pen is configured to control the range of motion of the needle set.

3. The tattoo pen according to claim 2 further comprises an illuminating unit set on the needle set so that when the needle is in operation for tattooing the illuminating unit illuminates the skin portion being tattooed.

4. The tattoo pen according to claim 2 further comprises a housing in which the needle assembly and the motor are contained.

* * * * *